United States Patent

Inoue

[11] 4,223,198
[45] Sep. 16, 1980

[54] ARM DEFLECTION CONSTANT TRAVELING-WIRE EDM METHOD AND APPARATUS

[75] Inventor: Kiyoshi Inoue, Tokyo, Japan

[73] Assignee: Inoue-Japax Research Incorporated, Yokohama, Japan

[21] Appl. No.: 1,290

[22] Filed: Jan. 5, 1979

[30] Foreign Application Priority Data

Jan. 11, 1978 [JP] Japan .................................. 53-1085
Mar. 22, 1978 [JP] Japan ................................ 53-31668

[51] Int. Cl.³ .............................................. B23P 1/08
[52] U.S. Cl. ............................... 219/69 W; 219/69 M
[58] Field of Search .......................... 219/69 M, 69 W

[56] References Cited

U.S. PATENT DOCUMENTS 3,822,374  7/1974  Ullmann et al. ................... 219/69 W
3,912,899  10/1975  Lehmann et al. ................ 219/69 W Primary Examiner—B. A. Reynolds
Assistant Examiner—Clifford C. Shaw
Attorney, Agent, or Firm—Karl F. Ross

[57] ABSTRACT

The deflection of at least one arm of a traveling-wire EDM machine, whose arms are spanned by the wire, is detected and the resulting signal used to control the wire advance to maintain the deflection constant.

10 Claims, 2 Drawing Figures

ARM DEFLECTION CONSTANT TRAVELING-WIRE EDM METHOD AND APPARATUS

FIELD OF THE INVENTION

The present invention relates generally to a traveling-wire electrical discharge machine (TW-EDM) and in particular to an improved method and apparatus for operating a TW-EDM machine whereby an increased machining accuracy is obtained.

BACKGROUND OF THE INVENTION

Machines adapted to perform the electrical discharge machining (EDM) process with a continuous wire or a like electrode typically employ a pair of arm members individually extending from a machine column and provided at their respective free end portions with wire guide sections, generally in the form of rollers, to guide and stretch the wire electrode therebetween across a machining zone, the wire electrode being continuously fed from a supply reel provided on the machine column upstream of one of the guide sections and wound or collected on a take-up reel arranged on the machine column downstream of the other guide section. An electrical power supply is connected to the wire electrode and a workpiece which is disposed in juxtaposition therewith in the machining zone to effect a series of electrical discharges between the traveling wire electrode and the workpiece across a machining gap flushed with a liquid dielectric, e.g., distilled water, to remove material from the workpiece.

Means for feeding and collecting the wire electrode and transporting or advancing it through the machining zone generally includes drive means disposed in a path between the wire take-up reel and one guide section and brake means disposed in a path between the other guide section and the wire supply reel. The wire drive means typically comprise a drive roller continuously rotated by a motor and an idler roller rotated in frictional contact with the drive roller holding the wire electrode therebetween while the wire brake means may comprise a similar roller arrangement driven by a motor to impart to the wire electrode continuously fed by the drive rollers a brake force sufficient for the latter to be stretched straight under tension and thus tightly between the wire guide sections. The necessary brake force or tension is obtained, for instance, by adjusting the rate of rotation of the feed drive roller several percent greater than that of the brake drive roller.

The guide sections are required not only to position the wire electrode precisely in a cutting relationship with the workpiece in the machining zone but also to serve to change the wire advance direction from the wire supply side to the machining zone and from the latter to the wire take-up side or thus to guide the wire electrode from one direction to that substantially normal thereto since the arm members respectively carrying the guide sections individually extend from the column which is vertically mounted on a machine base which carries a machining table supporting the workpiece and the wire supply reel and the wire take-up reel are both arranged on or in the machine column. As a result, considerable bending forces develop of the arm members so that the latter tend to deflect inwardly or toward the machining region.

The wire electrode is generally very thin and its change in frictional stresses at drive and brake roller portions results in change in tension applied on the wire electrode and hence in change in deflection of the arms which guide the wire electrode at their free end portions. The deflection of the arms tends also to change due to variation in other external forces and irregularity of temperature distribution over the arms.

Change in the deflection of the arms is disadvantageous since it causes deviation of the wire electrode from the preset machining position relative to the workpiece and accordingly results in the inability to perform cutting in the latter along a prescribed path and hence lack of machining accuracy. Furthermore, the fluctuations of the beding of the guide arm members can cause short-circuiting between the wire electrode and the workpiece.

OBJECTS OF THE INVENTION

It is accordingly an object of the present invention to provide an improved method of operating a TW-EDM machine whereby the amount of deflection of the wire-guiding arms is held constant to maintain the relative spacial relationship between the guided wire electrode and the workpiece as preset throughout a machining operation.

Another object of the present invention is to provide an apparatus for carrying out the method whereby the innacuracy of machining due to varying deflections of the wire guiding arm members is substantially eliminated.

SUMMARY OF THE INVENTION

In accordance with the present invention, there is provided a method of operating a traveling-wire electrical discharge machine having a continuous wire or like elongated electrode; a pair of arm members individually extending from a common support carried by the machine base and having at their respective free end portions wire guide sections adapted to guide the wire electrode and to position it in machining relationship with a workpiece in a machining zone; and means for continuously advancing the wire electrode from a supply reel disposed on the support to a take-up reel disposed on the support to stretch and continuously transport said wire electrode between the guide sections across said machining zone, the improved method comprising the steps of: sensing the deflection of at least one of the arm members and controlling the electrode advancing means so as to maintain the sensed deflection substantially constant.

An apparatus for carrying out the method according to the invention is adapted to operate the traveling-wire electrical comprises a means for sensing the deflection of at least one of the arm members and means responsive to the sensing means for controlling the advancing means so as to maintain the sensed deflection substantially constant.

In connection with the afore-mentioned control step or means, the advancing means controlled thereby may comprise drive means including feed drive rollers disposed in a path between one of the guide sections and the take-up reel and driven by a motor for drawing the continuous wire electrode from said supply reel and the step may be performed or means provided for operation of the motor rotating the feed drive rollers.

The wire-advancing means can also include brake means comprising brake rollers disposed in a path between one of said guide sections and said supply reel rotated in the opposite sign to that of the feed drive rollers by a brake drive motor for tending to drive the wire electrode in the opposite direction to that in which it is advanced and the step may be performed or means provided for controlling the operation of the brake drive motor rotating the brake rollers.

BRIEF DESCRIPTION OF THE DRAWING

The present invention will be described in detail hereinafter, with reference to the accompanying drawing in which.

SPECIFIC DESCRIPTION

Figure 1:
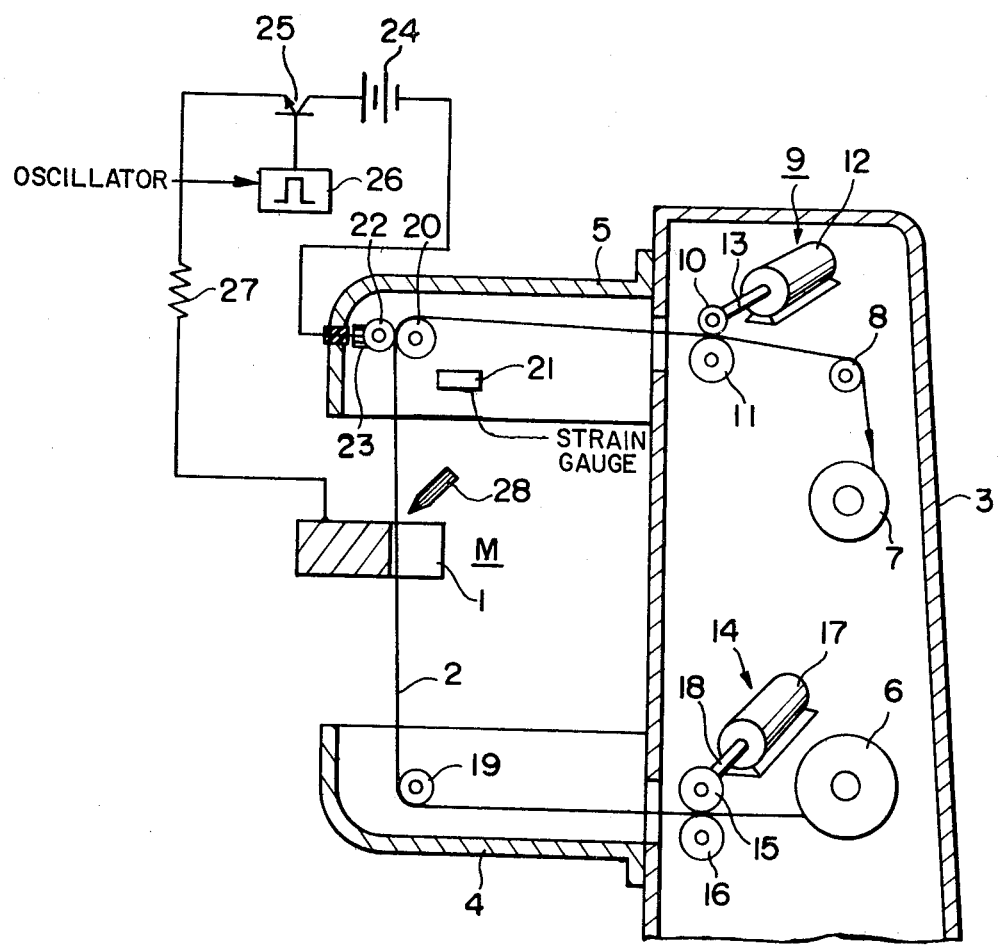
FIG. 1 is a diagrammatic view, partly in section, illustrating a system embodying the present invention.

In FIG. 1, a workpiece 1 is shown disposed in a machining zone M in juxtaposition with a wire or like elongated electrode 2 and is supported on a work table (not shown) which is in turn mounted on a machine base (not shown). The machining zone M is provided between a pair of arm members 4 and 5 which extend horizontally from a column 3 which is vertically mounted on the machine base. The wire electrode 2 is continuous across the machining zone M along the path between a supply reel 6 on which it is stored and a take-up reel 7 on which it is collected. The wire electrode 2 is continuously advanced or transported along the path by feed means 9 comprising drive rollers 10 and 11 of which one is coupled with a servo motor 12 via a drive shaft 13 so that the electrode is thereby continuously drawn from the supply reel 6 and wound on the take-up reel 7. Wire brake means 14 includes brake rollers 15 and 16 of which one is coupled with a DC motor 17 via a drive shaft 18.

The arms 4 and 5 are provided at their respective free end portions with wire guide sections or elements 19 and 20 to guide and stretch the transported wire electrode 2 therebetween across the machining zone M.

In accordance with the principles of the present invention, means for sensing the deflection of at least one of the arm members 4 and 5 is provided and may be a strain gauge 21 attached as shown.

Disposed in bearing relationship with the guide roller 20. across the wire electrode 2 is a power delivery roller 22 which is connected via a bushing 23 with one terminal of an EDM power supply shown comprising a DC source 24 connected in series with a switching element shown as a transistor 25 and a current-limiting resistor 27 leading to the workpiece 1 via the other terminal. The switching element 25 shown is to be controlled by an oscillator 26 to apply a pulsed electric current from the DC source 24 between the workpiece 1 and the wire electrode 2.

A machining fluid or liquid dielectric, e.g. distilled water, is supplied to the machining zone M from a nozzle 28 to serve as an EDM medium and also to carry away eroded materials from the machining zone M.

During a machining operation, assuming that the amount of deflection of the arms 4 and 5 is constant, the positions of the guide sections 19 and 20 will be held constant so that the wire electrode 2 is axially displaced, while maintaining a machining relationship with the workpiece 1 precisely as preset.

However, slipping of the wire electrode 2 in contact with feed rollers 10, 11 or brake rollers 15, 16 causes change in tension stretching it and hence change in the deflection the arms 4 and 5 to alter the positions of the guide sections 19 and 20 so that machining becomes inaccurate.

The embodiment of the invention illustrated is designed to sense the deflection of the arm 5 with the strain gauge 21 which provides a signal indicative of the amount of the deflection and to control either or both of the DC motor 12 and the DC generator 17 so as to maintain the detected signal constant.

Figure 2:
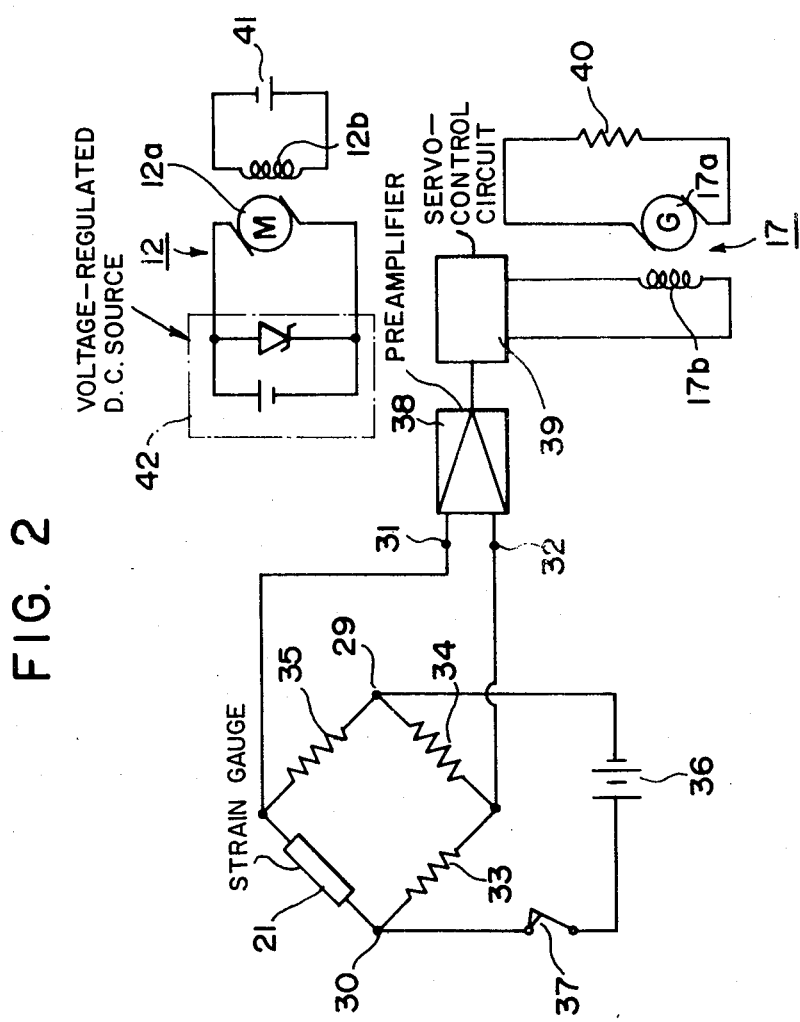
FIG. 2 is a circuit diagram illustrating the principles of the present invention.

In FIG. 2 I have shown at 12a and 12b an armature and an energizing coil for the DC motor 12; 17a and 17b an armature and an energizing coil for the DC generator 17; at 29 through 32 terminals; at 33 through 35 resistors of a fixed resistance R; at 36 a DC source; at 37 a switch; at 38 a preamplifier; at 39 a servo control circuit; at 40 a load resistor; at 41 a current-regulated DC source; and at 42 a voltage-regulated DC source.

As shown, the strain gauge 21 and fixed resistors 33, 34 and 35 are arranged in the configuration of a Wheatstone bridge with the terminals 29 and 30 having the DC source connected thereacross via the switch 37. The terminals 31 and 32 provide an output voltage proportional in amplitude to the amount in which the arm 5 is deflected.

The DC motor 12 is an energizable motor with its armature coil 12a connected to the fixed voltage source 42 and its energizing coil 12b connected to the fixed current source 41.

Thus, the DC motor 12 rotates at a fixed rate independent of the shaft or axial-load torque and the armature coil 12a receives a current in proportion to that shaft or axial-load torque.

The shaft or axial-load torque TM is the sum of the resistance torque TW caused by the displacement of the wire-electrode 2 and the turning resistance TD of the supply reel 6.

The output voltage appearing across the terminals 31 and 32 is applied to the servo control circuit 39 which, so as to maintain its input signal, controls the energizing current for the DC generator 17.

Thus, when a disturbance tending to increase the deflection of the arm 5 occurs, the servo control circuit 39 will decrease the fixed current flowing through the coil 17b, thereby decreasing the amount of electricity produced by the generator 17. Then, the torque of the shaft or pulley 15 and hence the braking action of the unit 14 will be reduced, automatically reducing the shaftload torque of the DC motor 12 to maintain the amount of the deflection of the arm 5 constant.

In this case, while the armature current for the DC motor 12 is reduced, its rate of rotation is invariable so that the rate of axial advance of the wire electrode 2 and the rate of rotation of the generator 14 are both held constant.

Conversely, with a disturbance occurring which tends to decrease the amount in which the arm is deflected, the servo control circuit 39 will increase both the current passing through the armature 12a and the field current passing through the coil 17b thereby intensifying both the tension applied by the unit 9 and the braking action by the unit 14 to maintain the deflection of the arm 5 constant.

The embodiment of the present invention illustrated admits of various modifications. For example, the strain gauge for sensing the deflection of one or both of the arms 4 and 5 may be replaced by any known deflection sensor such as an electromagnetic micrometer or differential transformer for coupling with one or both of the arms 4 and 5. The strain gauge need not be attached on the surface of the arm and instead may be embedded therein. Of course, a pair of strain gauges may be used respectively for the two arms.

The motor for driving the wire feed unit 9 may not be of energized DC type but may be of any type. The current flowing through energizing coil 17b for the DC generator 17 may be held constant while the energizing current for the DC motor 12 may be controlled in response to the servo control circuit 39. In this case, the rates of rotation of both the DC motor 12 and the DC generator 17 are controlled to control the tension by the unit 9 and the braking force by the unit 14.

It is also possible to simultaneously control the armature current and/or the energizing current for the motor of the wire feed drive unit and/or the generator of the brake unit.

The brake unit is also not restricted to DC generators as described but may be any other known type such as an electromagnetic brake.

There is thus provided an improved method of and apparatus for operating a traveling-wire electrical discharge machine capable of performing a machining operation at an increased accuracy.

I claim:

1. A method of operating a traveling-wire electrical discharge machine including a continuous elongated electrode, a pair of arm members constituting an electrode-guiding arm system by being fixedly mounted individually on a common support and having at their respective free end portions guide sections spanned by said electrode for positioning it in a predetermined machining relationship with a workpiece, and means for advancing said elongated electrode from a supply reel to a take-up reel to axially transport and stretch said elongated electrode between said guide sections across a machining zone, said method comprising the steps of:
   (a) sensing the deflection of at least one of said arm members and generating an electrical signal representing said deflection, and
   (b) controlling said electrode-advancing means in response to said electrical signal so as to maintain said deflection of said electrode-guiding arm system substantially constant, thereby maintaining the positioning of the spanned elongate electrode in said predetermined machining relationship with the workpiece.

2. The method defined in claim 1 wherein said electrode-advancing meeans includes feed roller means disposed in a path between said take-up reel and one of said guide sections to frictionally drive said elongated electrode, and a motor for driving said feed roller, said step (b) comprising controlling the operation of said motor in accordance with said electrical signal.

3. The method defined in claim 1 or claim 2 wherein said electrode-advancing means includes brake roller means disposed in a path between said supply reel and one of said guide sections to frictionally brake said elongated electrode, and a motor connected to said brake roller means, said step (b) comprising controlling the operation of said motor connected to said brake roller means in accordance with said electrical signal.

4. In an apparatus for operating a traveling-wire electrical discharge machine including a continuous elongated electrode, a pair of arm members constituting an electrode-guiding arm system, said arm members being fixedly mounted individually on a common support and having at their respective free end portions electrode guide sections spanned by said elongated electrode for positioning it in a predetermined machining relationship with a workpiece, and means for continuously advancing said electrode from a supply reel to a take-up reel to axially transport and stretch said electrode between said guide sections across a machining gap, the improvement wherein said apparatus further comprises:
   means for sensing the deflection of at least one of said arm members and generating an electrical signal representing said deflection, and
   means responsive to said sensing means for controlling said advancing means so as to maintain deflection of said electrode-guiding arm system substantially constant, thereby maintaining the positioning of the elongated electrode between said guide sections in said predetermined machining relationship with the workpiece.

5. The apparatus defined in claim 4 wherein said advancing means includes feed rollers disposed in a path between said take-up reel and one of said guide sections to frictionally advance said wire electrode and driven by a motor, and said control means includes means for controlling the operation of said motor.

6. The apparatus defined in claim 4 wherein said advancing means includes rollers disposed in a path between said supply reel and one of said guide sections to frictionally brake said wire electrode and driven by a motor said controlling means include means for controlling the operation of said motor.

7. A method of operating a traveling-wire electrical discharge machine including a continuous elongated electrode, a pair of arm members fixedly mounted individually on a common support and having at their respective free end portions guide sections spanning said elongated electrode for positioning it in a predetermined machining relationship with a workpiece, and means for continuously advancing said electrode from supply reel means carried by said support remote from said guide sections to take-up reel means carried by said support remote from said guide sections to axially transport and stretch said electrode between said guide sections across a machining zone so that said arm members tend to deflect toward said machining zone, said method comprising the steps of:
   (a) sensing deviation of the deflection of at least one of said arm members from a predetermined value to provide an electrical signal representing said deviation, and
   (b) controlling said electrode-advancing means in accordance with said electrical signal so as to reduce said deviation substantially to zero.
,18
8. The method defined in claim 7 wherein said step (a) comprises mechano-electrically detecting the deflection of at least one of said arm members to derive said electrical signal representing the amount of said deflection.

9. An apparatus for operating a traveling-wire electrical discharge machine including a continuous elongate electrode, a pair of arm members mounted individually on a common support and having at their respective free end portions guide sections spanning said elongated electrode for positioning it in a predetermined relationship with a workpiece, and means for continuously advancing said electrode from supply reel means carried by said support remote from said guide sections to take-up reel means carried by said support remote from said guide sections to axially transport and stretch said electrode between said guide sections across a machining zone with said arm members tending to deflect toward said machining zone, said apparatus comprising means for sensing the deflection of at least one of said arms to produce an electrical signal representing a deviation of said deflection from a predetermined value and means responsive to said sensing means for controlling said electrode-advancing means in accordance with said electrical signal so as to maintain said deflection substantially constant.

10. The apparatus defined in claim 9 wherein said sensing means includes a strain gauge attached at said one of said arms.

* * * * *